(12) United States Patent
Corley

(10) Patent No.: US 7,376,345 B2
(45) Date of Patent: May 20, 2008

(54) CAMERA REFERENCE DEVICE AND METHOD OF TAKING A PHOTOGRAPHIC IMAGE USING A CAMERA REFERENCE DEVICE

(76) Inventor: Ferrand David Ernest Corley, 80 Kleins Crescent, Kleinburg, Ontario (CA) L0J 1C0

( * ) Notice: Subject to any disclaimer, the term of this patent is extended or adjusted under 35 U.S.C. 154(b) by 745 days.

(21) Appl. No.: 10/841,047

(22) Filed: May 7, 2004

(65) Prior Publication Data

US 2005/0248658 A1 Nov. 10, 2005

(51) Int. Cl.
*G03B 15/00* (2006.01)
*G03B 43/00* (2006.01)

(52) U.S. Cl. .................. 396/5; 396/315; 396/332; 348/188

(58) Field of Classification Search ............ 396/1, 396/5, 315, 14, 16, 322, 332; 348/188
See application file for complete search history.

(56) References Cited

U.S. PATENT DOCUMENTS

| | | | | |
|---|---|---|---|---|
| 5,371,538 A | * | 12/1994 | Widger ................. | 348/188 |
| 6,560,410 B2 | * | 5/2003 | Ichikawa et al. ............ | 396/2 |
| 6,734,899 B1 | * | 5/2004 | Okamoto ................. | 348/188 |
| 7,057,641 B2 | * | 6/2006 | Bodnar et al. ............. | 348/188 |
| 7,248,284 B2 | * | 7/2007 | Pierce ................... | 348/188 |
| 2004/0212680 A1 | * | 10/2004 | Schroeder et al. ......... | 348/188 |

\* cited by examiner

*Primary Examiner*—W. B. Perkey

(57) ABSTRACT

This invention relates to an apparatus and method to permit a photographer to take accurate portraiture pictures. There is provided a camera reference device for adjusting the settings on a camera comprising a reference member with qualitative indicia for determining picture sharpness and colour for adjusting the settings on the camera and which allows for the taking of a picture of the face and head of the subject within the same photographic image beside the reference member. Using the device, there is provided a method of taking a photographic image comprising: taking a picture of the subject in combination with an apparatus comprising a reference member with qualitative indicia for determining photographic image qualities for adjusting the settings on the camera and which allows for the taking of a picture of the face and head of the subject within the same photographic image beside the reference member.

10 Claims, 3 Drawing Sheets

CAMERA REFERENCE DEVICE AND METHOD OF TAKING A PHOTOGRAPHIC IMAGE USING A CAMERA REFERENCE DEVICE

FIELD OF THE INVENTION

This invention relates to an apparatus and method to permit a photographer to take accurate portraiture pictures.

BACKGROUND OF THE INVENTION

In the past, it has been difficult to provide consistent standards in photographs of people for identification documents such as driver's licenses, passports, health cards, to name a few. The conditions within which the pictures are taken and the settings of the cameras vary so greatly, that often the photograph does not provide a useful and accurate image of the subject.

This is well known and accepted to the extent that great latitude is given to people using these cards. Consequently, borrowing or use by people other than the subject of the photograph, and misidentification occurs. This raises problems for deceit and security.

There is therefore a need for an apparatus and method which would permit the photographer to consistently meet a high standard of image reproduction with the camera, and which would provide an indication to the person looking at the photograph that, besides being accurate, also indicates any critical distinguishing characteristic of the subject.

It is an object of the present invention to provide an apparatus which would permit the photographer to consistently meet a high standard of image reproduction with a camera.

It is another object of the present invention to provide a method which would permit the photographer to take a consistently accurate picture of his subject.

It is another object of the present invention to provide a method and apparatus which permits the photographer to take a photograph whereby the photograph would indicate to the person reviewing the photograph the quality of the picture.

SUMMARY OF THE INVENTION

According to one aspect of the present invention, there is provided a camera reference device for adjusting the settings on a camera comprising a reference member with qualitative indicia for determining picture sharpness and colour for adjusting the settings on the camera and which allows for the taking of a picture of the face and head of the subject within the same photographic image beside the reference member. Preferably the camera reference device for adjusting the settings on a camera is as claimed in claim 1 and has a reference member which is u-shaped having two side members and a central bridging bottom member which connects the two side members, there being an opening between the two side members where the subject can place his or her head for the taking of a photograph.

According to another aspect of the present invention, there is provided a method of setting the adjustments on a camera comprising the steps of: placing a photograph of known quality and with qualitative indicia markings in a photographic setting; taking a photographic image using a camera; comparing that photographic image against a table of photographic images of varying quality to determine the quality of the photographic image; adjusting the settings on the camera as determined by the image within the table of photographic images.

According to yet another aspect of the present invention there is provided a method of taking a photographic image comprising the steps of: taking a picture of the subject in combination with an apparatus comprising a reference member with qualitative indicia for determining photographic image qualities for adjusting the settings on the camera and which allows for the taking of a picture of the face and head of the subject within the same photographic image beside the reference member.

This invention will be readily understood after reading the following description of the preferred embodiments in conjunction with the drawings, a brief description of which follows.

DETAILED DESCRIPTION

Figure 1:
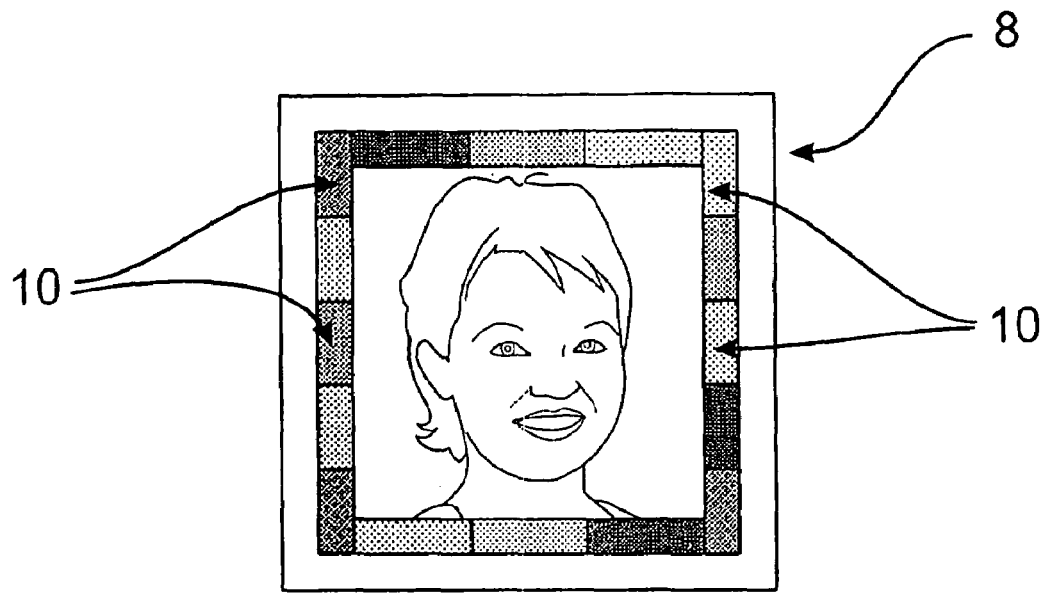
FIG. 1 is an illustration of a photograph of known quality marked with qualitative indicia of the type which might be used in the preferred embodiment of the inventor's method.

Referring to the drawings, FIG. 1 is an illustration of a photograph test pattern 8 of known quality and with qualitative indicia, in this case standardized colour bars 10. The photograph test pattern 8 is of high quality in colour and resolution, and the colour bars are each of a standardized reflective wavelength for that particular colour. For instance one of colour bars 10 could be a green and another of the colour bars might be a red or white. Before taking a picture of a subject, the operator of a camera is able to adjust the settings on the camera by taking a picture of the reference photograph 8. Once taken, the photographic image 12 (see FIG. 3) produced can be compared against a table 14 of photographic images 16, some of which are correct, some of which may be acceptable but less than correct, and some of which may be of unacceptable quality. The operator of the camera compares the photographic image 12 with the table 14 and matches the photographic image 12 with the closest of the photographic images 16. When the match has been made, the operator knows what adjustments need be made to his camera, if any. For instance, the photographic image 12 may match up with an image of the images 16 requiring more blue or, alternatively, more red. Or the white meter may require more adjustment. By making the match, however, the camera can be standardized to take accurate pictures in respect of the quality for which it has been tested in accordance with this method. The test pattern in FIGS. 1 and 3 relate to colour quality, hue, saturation, contrast and luminance.

Figure 2:
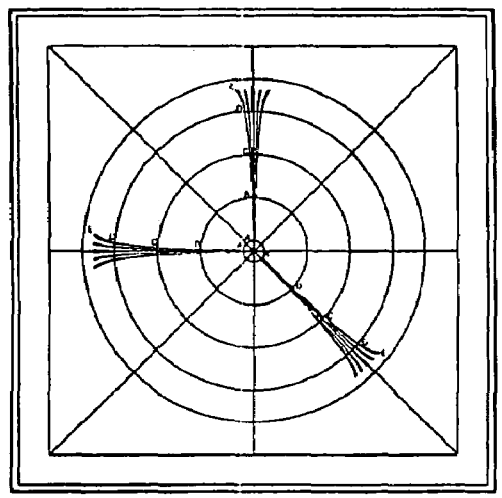
FIG. 2 is an illustration of a photograph of known quality marked with qualitative indicia of the type which might be used in the preferred embodiment of the inventor's method.

The camera may be tested for numerous qualities using this method, including tonal range, luminance, contrast, colour hue, colour saturation, sharpness/resolution, linearity/geometry and scale/size. The test pattern shown in FIG. 2 is a test pattern for which sharpness/resolution and distortion are being tested and includes linear representations which determine those factors.

This method represents an advance in the art because its use ensures accuracy in different settings. A person looking at a photograph or photographic image (perhaps digitally produced on a computer screen) that has been created by a camera set in accordance with this method can have some assurance that the photographic image is accurate to a set standard. If no adjustment is made, the quality of the photographic image and its true resemblance to the subject remains an unknown, and its use could be subject to abuse or ill-use.

Preferably the photographic test pattern 8 is produced on a strong backing and is laminated to provide sustainable weatherability. Materials useful for this purpose are known to those skilled in the art.

Similar materials are preferably used to produce the test pattern. Preferably, there would also be included instructions as to how to correctly adjust the camera after the comparison has been properly made between the produced photographic image 12 and one of the test pattern images 16.

Once the camera is so corrected, identification photographic images of the subject can be produced more accurately.

Figure 4:
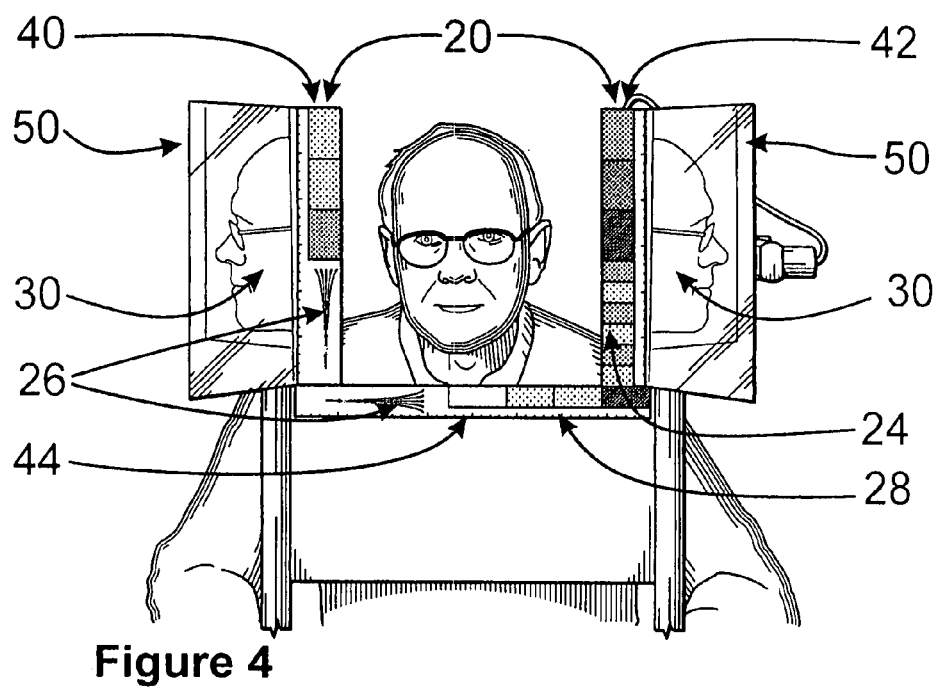
FIG. 4 is an illustration showing the front view of the inventor's apparatus comprising a preferred embodiment of the present invention with a subject person posing for portrait.
Figure 5:
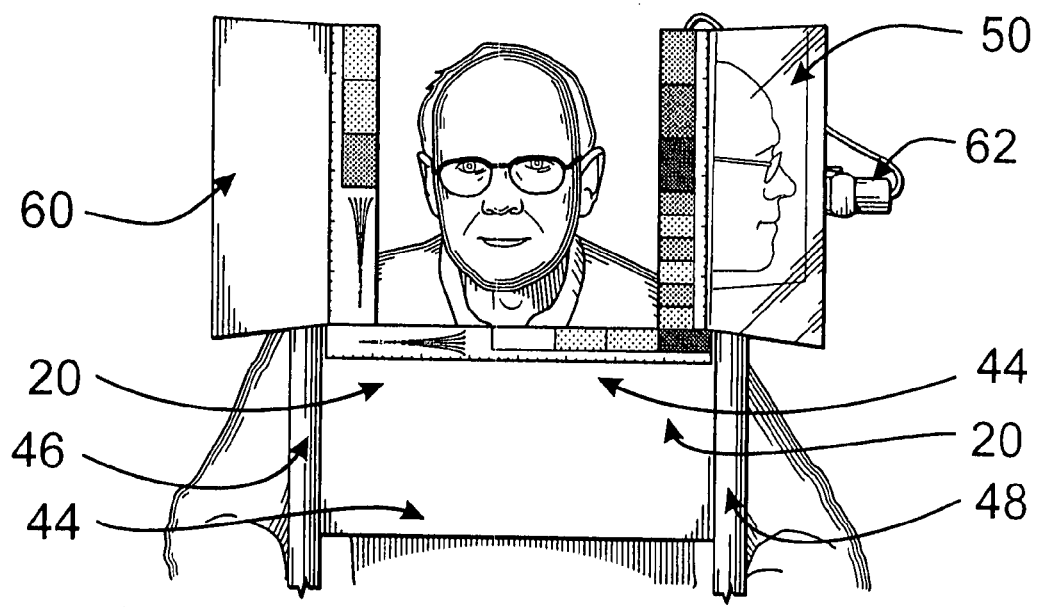
FIG. 5 is an illustration showing the front view of a second preferred embodiment of the invention with a subject person posing for portrait.
Figure 6:
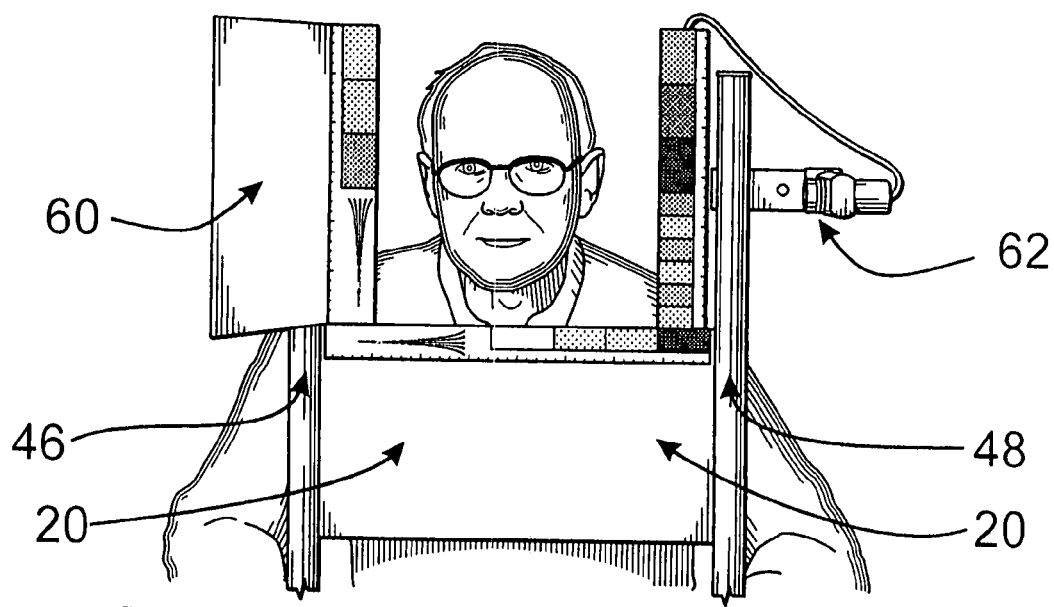
FIG. 6 is an illustration showing the front view of a third preferred embodiment of the invention with a subject person posing for portrait.

Further to the above, the inventor has also invented a reference member, generally referred to by the numeral 20, in FIGS. 4, 5 and 6, which includes qualitative indicia 22 for setting the quality of the camera as described above in respect of colour as at 24 and sharpness as at 26 and scale as at 28.

The reference member 20 is disposed to allow for the taking of a picture of the face and head of a subject, such as 30, within the same photographic image beside the reference member 20. The resulting photographic image with the reference member appearing within it can then be adjudged as to its quality and characteristics, the accuracy of which could not heretofore be determined by looking at the photographic image can be determined by the person looking at the image.

In the preferred embodiment, the reference member 20 is u-shaped having two side members 40, 42 and a central bridging bottom member 44 which connects the two side members 40 and 42. The opening 44 between the two side members 40 and 42 provides a position where the subject can place his or her head for the taking of a photographic image by the camera.

Figure 3:
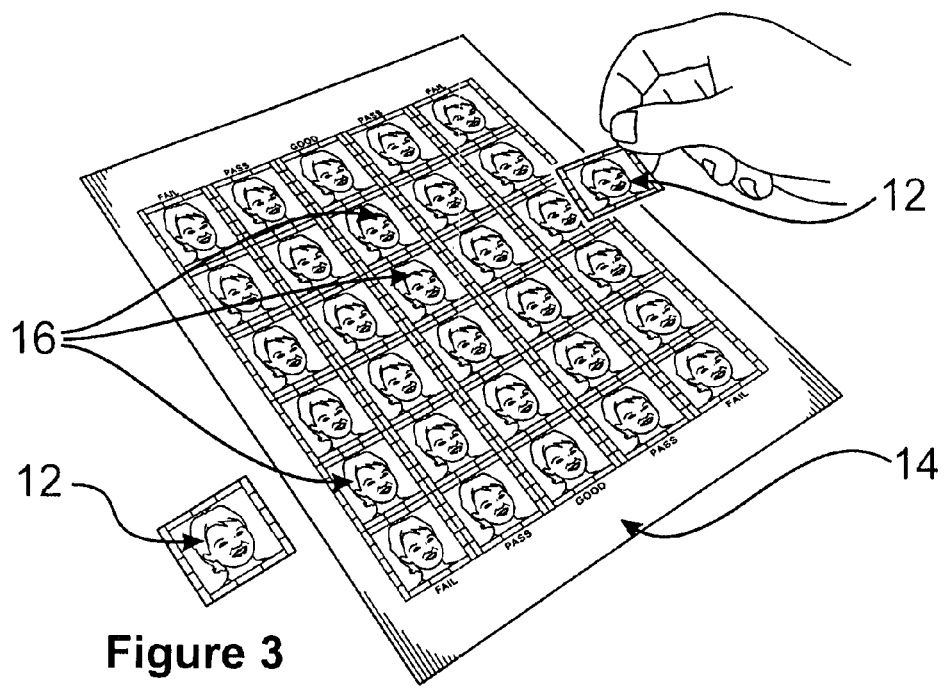
FIG. 3 is an illustration showing the comparison of a photographic image against a table of photographic images of varying quality to determine the quality of the photographic image in a manner consistent with the inventor's method.

As was the case with the reference devices shown in FIGS. 1, 2 and 3, any type of qualitative indicia may be utilized on the reference member 20. Such indicia can include tonal range, luminance, contrast, colour hue, colour saturation, sharpness/resolution, linearity/geometry and scale/size.

Wherein there is a base member, such as indicated generally by the numeral 44, and a telescoping support shafts 46 and 48, the reference member 20 can be raised or lowered to suit the height of the subject.

In some of the embodiments, mirrors 50 can be advantageously mounted to the reference member 20 so that the side of the face of a subject 30 can be shown. This permits a full viewing of the facial characteristics of the subject 30, not heretofore obtained in identification pictures. Where there are two mirrors 50 mountable to the reference member 20, one of the two mirrors 50 can reflect forwardly the right side of a subject's face and the other of the two mirrors can reflect forwardly the left side of a subject's face. Such an embodiment is illustrated in FIG. 4.

Alternatively, as illustrated in FIG. 5, a background member 60 and a mirror 50 may be mountable to the reference member 20 at opposing sides of the reference member 20. The mirror 50 reflects forwardly a side of a subject's face and the background member 60 provides a reflective background for the mirror 50 in use.

As yet another alternative, as illustrated in FIG. 6, a second side camera 62 can be mounted at the side of the reference member 20 so that a side photographic image can be separately taken by this second camera while the frontal photograph is being taken. The option of providing a background member 60 is also available.

The materials used for making the apparatus are varied and can be chosen by a person of ordinary skill in the art to suit their particular circumstances of use. All composition parts are known to those skilled in the art.

Using the apparatus disclosed, the user can thereby adopt of method of taking a photographic image to obtain a photographic image of consistently high quality and which itself provides an indication of that quality. The user takes a picture of the subject in combination with an apparatus comprising a reference member with qualitative indicia for adjusting the settings on the camera and which allows for the taking of a picture of the face and head of the subject within the same photographic image beside the reference member. The qualitative indicia may include tonal range, luminance, contrast, colour hue, colour saturation, sharpness/resolution, linearity/geometry and scale/size.

The method is enhanced wherein the reference member is u-shaped having two side members and a central bridging bottom member as described above. This allows the subject 30 to place his or her head in the opening for the taking of a photograph. Slideably mounting the reference member to a base permits adjustment of the height of the reference member. Mirrors and background members can be simultaneously mounted onto the side of the reference member to reflect the side of the face of a subject whose picture is being taken using the reference member as aforedescribed.

The embodiments illustrated are provided as examples of the preferred embodiments only. Other embodiments will be apparent to those skilled in the art without deviating from the scope of the invention. The scope of the invention is as defined in the appended claims.

I claim:

1. A camera reference device for adjusting the settings on a camera comprising a reference member with qualitative indicia for determining picture sharpness and colour for adjusting the settings on the camera and which allows for the taking of a picture of the face and head of the subject within the same photographic image beside the reference member; and, a base member, the reference member being slidably mounted to the base member to permit adjustment of the height of the reference member.

2. A camera reference device for adjusting the settings on a camera as claimed in claim 1 wherein the reference member is u-shaped having two side members and a central bridging bottom member which connects the two side members, there being an opening between the two side members where the subject can place his or her hand for the taking of photography.

3. A camera reference device for adjusting the settings on a camera as claimed in claim 1 wherein the indicia on the reference member are colour indicia scale and sharpness indicia.

4. A camera reference device for adjusting the settings on a camera as claimed in claim 1 wherein there is a mirror mountable to the reference member at its side to be disposed to reflect the side of the face of a subject whose picture is being taken using the reference number.

5. A camera reference device for adjusting the settings on a camera as claimed in claim 1 wherein there are two mirrors mountable to the reference member, one of the two mirrors being mountable on the right side of the reference member to reflect forwardly the right side of a subject's face and the other of the two mirrors being mountable on the left side of the reference member to reflect forwardly the left side of a subjects's face.

6. A camera reference device for adjusting the settings on a camera as claimed in claim 1 wherein there is a background member and a mirror mountable to the reference member, the mirror being mountable at one of the sides of the reference member to reflect forwardly a side of a subject's face and the background member being mountable at the other of the sides of the reference member to provide a reflective background for the mirror use.

7. A method of taking a photographic image using apparatus wherein a mirror is mounted onto the side of a reference member to reflect the side of the face of a subject whose picture is being taking using the reference member, and comprising:

taking a picture of a subject in combination with an apparatus comprising a reference member with qualitative indicia for determining photographic image qualities for adjusting the settings on the camera and including using the mirror to reflect the side of the face of a subject whose picture is being taking using the reference member, which allows for the taking of a picture and head of the subject within the same photographic image beside the reference member.

8. A method as claimed in claim 7 wherein the reference member is u-shaped having two side members and a central bridging bottom member which connects the two side members, there being an opening between the two side members where the subject can place his or her head for the taking of a photograph.

9. A method as claimed in claim 7 wherein indicia on the reference member are colour indicia, scale indicia and sharpness indicia.

10. A method as claimed in claim 7 wherein indicia on the reference member is adjusted by telescopic adjustment of the base member.

* * * * *